United States Patent
Zhao

(10) Patent No.: US 8,970,083 B2
(45) Date of Patent: Mar. 3, 2015

(54) STEPPING MOTORS WITH SMALL STEP INTERVALS

(75) Inventor: Steve Zong-Ping Zhao, Woodland Hills, CA (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 13/124,851

(22) PCT Filed: Sep. 8, 2009

(86) PCT No.: PCT/US2009/005038
§ 371 (c)(1), (2), (4) Date: Apr. 19, 2011

(87) PCT Pub. No.: WO2011/031250
PCT Pub. Date: Mar. 17, 2011

(65) Prior Publication Data
US 2011/0198950 A1    Aug. 18, 2011

(51) Int. Cl.
*H02K 21/00* (2006.01)
*H02K 37/20* (2006.01)
*H02K 37/04* (2006.01)

(52) U.S. Cl.
CPC ............ *H02K 37/20* (2013.01); *H02K 37/04* (2013.01); *H02K 2213/03* (2013.01)
USPC ...................... 310/181; 310/49.28; 310/49.36

(58) Field of Classification Search
USPC .......... 310/49.01, 49.28, 49.36, 49.46, 49.53, 310/181, 12.21, 12.22, 12.24, 12.25
See application file for complete search history.

(56) References Cited

U.S. PATENT DOCUMENTS

| | | | |
|---|---|---|---|
| 3,428,837 A | | 2/1969 | Morreale |
| 4,190,779 A | | 2/1980 | Schaeffer |
| 4,288,709 A | | 9/1981 | Matthias |
| 4,315,171 A | | 2/1982 | Schaeffer |
| 4,504,750 A | * | 3/1985 | Onodera et al. ........... 310/12.21 |
| 4,712,028 A | | 12/1987 | Horber |
| 4,713,570 A | * | 12/1987 | Mastromattei ................ 310/181 |

(Continued)

FOREIGN PATENT DOCUMENTS

| | | |
|---|---|---|
| CN | 543829 A | 10/1973 |
| EP | 0385203 | 9/1990 |

(Continued)

OTHER PUBLICATIONS http://www.cs.uiowa.edu/~jones/step/: see PDF print of document, dated Jan. 27, 2014.

(Continued)

*Primary Examiner* — Dang Le
(74) *Attorney, Agent, or Firm* — Phillips Lytle LLP

(57) ABSTRACT

An improved motor (90) broadly including a first member (30) and a second member (20) mounted for movement relative to one another. The first member has a plurality of poles (32) spaced substantially equidistantly. The second member has a plurality of arms (22). Each arm includes a plurality of fingers (27), a permanent magnet (29), and a coil (25). The fingers are arranged such that their distal end generally faces toward the poles on the first member. Each permanent magnet has a width that is greater than the pole spacing. Each arm is associated with one of a number of phases. The fingers of the arms within a particular phase are arranged such that they simultaneously align with respective poles when the first and second members are in one position relative to one another.

26 Claims, 11 Drawing Sheets

(56) References Cited

U.S. PATENT DOCUMENTS

| | | | |
|---|---|---|---|
| 4,728,830 A | | 3/1988 | Gamble |
| 4,761,574 A | * | 8/1988 | Nakagawa ................. 310/12.27 |
| 4,763,034 A | * | 8/1988 | Gamble ........................ 310/181 |
| 4,794,286 A | | 12/1988 | Taenzer |
| 4,857,786 A | | 8/1989 | Nihei |
| 5,128,570 A | | 7/1992 | Isozaki |
| 5,386,161 A | | 1/1995 | Sakamoto |
| 5,631,512 A | | 5/1997 | Kawabata et al. |
| 5,856,714 A | | 1/1999 | Sugiura |
| 6,051,898 A | * | 4/2000 | Sakamoto ................. 310/49.45 |
| 6,239,530 B1 | | 5/2001 | Garcia |
| 6,262,508 B1 | | 7/2001 | Shibayama |
| 6,320,347 B1 | | 11/2001 | Sakamoto |
| 6,652,249 B2 | * | 11/2003 | Kenney et al. ............. 417/410.3 |
| 6,657,353 B1 | | 12/2003 | Patarchi |
| 6,670,732 B2 | | 12/2003 | Sakamoto |
| 6,741,006 B2 | | 5/2004 | Sakamoto |
| 6,777,842 B2 | | 8/2004 | Horst |
| 7,064,468 B2 | | 6/2006 | Fujinaka |
| 7,928,612 B2 | * | 4/2011 | Chung et al. ............... 310/12.24 |
| 2002/0153792 A1 | | 10/2002 | Isozaki |
| 2005/0040723 A1 | | 2/2005 | Asai et al. |
| 2006/0006744 A1 | | 1/2006 | Nashiki |
| 2007/0013237 A1 | | 1/2007 | Badgerow |
| 2009/0009010 A1 | * | 1/2009 | Chung et al. .................... 310/46 |
| 2010/0148612 A1 | | 6/2010 | Takemoto |
| 2010/0259112 A1 | * | 10/2010 | Chung et al. .............. 310/12.18 |

FOREIGN PATENT DOCUMENTS

| | | |
|---|---|---|
| EP | 0780958 | 6/1997 |
| EP | 1517429 | 3/2005 |
| JP | 59153457 | 9/1984 |
| JP | 60113649 A | 6/1985 |
| JP | 61231864 | 10/1986 |
| WO | PCT/US08/010246 | 3/2010 |

OTHER PUBLICATIONS

PCT International Search Report for PCT/US2009/005038 Mar. 13, 2012; see PDF.

* cited by examiner

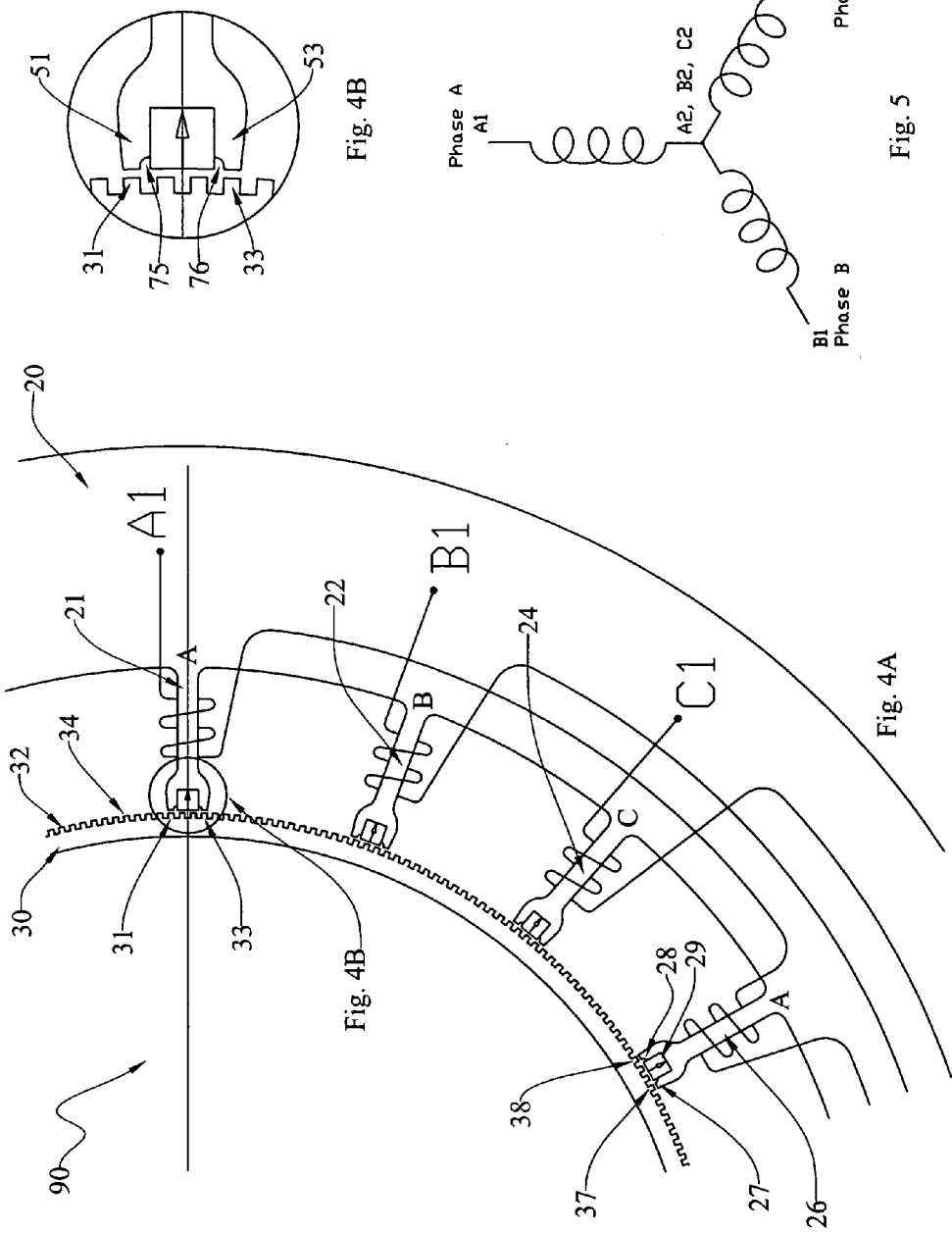

STEPPING MOTORS WITH SMALL STEP INTERVALS

TECHNICAL FIELD

This invention relates generally to electric motors, and, more particularly, to improved stepping motors with very small step intervals or increments.

BACKGROUND ART

There are three general types of stepping motors: the variable reluctance-type, the hybrid-type, and the permanent magnet-type. With an appropriate electronic motor driver (i.e., controller), all three types offer the capability of a wide range of angular stepping or indexing movements and characteristics. A general reference on the control of stepping motors can be found on-line at http://www.cs.uiowa.edu/~jones/step/ by Douglas W. Jones of the University of Iowa.

The variable reluctance-type ("VR-type") motors are traditionally built with salient rotor poles and salient stator fingers (or teeth), but without magnets. A VR-type motor is known for its lack of detent torque and low torque density. In order to improve torque density, both hybrid-type and permanent magnet-type stepping motors use permanent magnet(s) on the moving member (e.g., rotor) and/or stationary member (e.g., stator). They are indistinguishable from the motor driver's point of view. Traditionally, the rotor of a hybrid-type stepping motor is built with a donut-shaped magnet at the center of two rotor disks, which results in substantially axial flux flow from the magnet to the two rotor disks.

The stepping intervals of hybrid-type stepping motors are, typically, about 0.9° per step (i.e., for a motor having 100 rotor poles per rotor disk), or about 1.8° per step (i.e., for a motor having 50 rotor poles per rotor disk), or even larger. The inherent mechanical resonances associated with the step movement increases with step interval and rotor inertia. For smaller step intervals, the rotor sizes have to be increased to accommodate the increased number of required rotor poles. This leads to increased motor size, weight and cost. The use and handling of a large donut magnet for the rotor of the hybrid-type can be problematic due to the strong magnetic force and the fragile nature of magnets. A conventional solution for smaller step intervals and smoother step movement is to use a microstep motor controller to reduce the step interval from the full cardinal step to ½, ¼, ⅛, 1/16, or even smaller fractions, of a full cardinal step. However, microstepping is known for unequal step intervals and erratic jerks in rotor motions. A thorough review of microstepping can be found in US 2007/0013237 A1.

Various stepping motor designs involving permanent magnets are derived from magnetic circuit manipulation of poles and magnets. Among the motor designs that are relevant to this improved motor, Mastromattei (U.S. Pat. No. 4,713,570), Horber (U.S. Pat. No. 4,712,028), and Gamble (U.S. Pat. No. 4,728,830), have provided magnetically-enhanced variable-reluctance motor designs with permanent magnets sandwiched in stator fingers. Shibayama et al. (U.S. Pat. No. 6,262,508) use magnets in both the stator and rotor to increase the motor torque. Horst (U.S. Pat. No. 6,777,842) uses magnets inside the stator arms to minimize magnet material and manufacturing costs.

However, the permanent magnets in all the referenced prior art designs are associated with the stator finger(s) on the stator arms, and each stator finger is associated with a rotor pole. Due to limitations in the design of small magnets, it is impractical to use the motor designs typified by the foregoing prior patents in designing motors having very small step intervals that typically require a large number of rotor poles and stator fingers.

The stepping motors invented by Schaeffer (U.S. Pats. No. 4,190,779 and 4,315,171), and by Applicant (see, e.g., International Application PCT/US08/010,246), have a large number of alternately-magnetized magnets on the rotor to provide for small step intervals. The stepping intervals are, typically, 1.0° per step, 1.5° per step, or higher, for two-, three- and four-phase motors. These motors offer the advantage of high unpowered and powered detent torques, relatively-short axial motor lengths for small size and weight, small rotor inertias, and large through-hole solutions on the rotor. These motors have found great success in the last thirty years in space applications, such as in powering solar array drives, antenna pointing mechanisms, and other guidance, deployment and positioning systems.

When small step intervals and low motion-related disturbances are desired, the required number of rotor poles dramatically increases. For example, a three-phase, 1.5° per step, bipolar stepping motor may have an 80-pole rotor. However, a three-phase, 1.0° per step, bipolar motor may require a 120-pole rotor. Advanced applications in space, semiconductors, printing devices, and other automation fields may require state-of-the-art stepping motor designs with even smaller step intervals, lower rotor inertia, smoother step movement, higher resolutions, and greater step stability in reduced mechanism size and mass, etc. Further reduction of step interval would require very thin magnets that are easy to break, therefore, adding manufacturing cost and difficulties.

SUMMARY OF THE INVENTION

With parenthetical reference to the corresponding parts, portions or surfaces of the disclosed embodiment, merely for purposes of illustration and not by way of limitation, the present invention broadly provides an improved electrical motor. The improved motor (90) broadly includes a first member (30) and a second member (20) mounted for movement relative to one another. The first member has a plurality of poles (31, 32, 33, 34, 37, 38) spaced substantially equidistantly along the first member. The second member (20) has a plurality of arms (21, 22, 24). Each arm includes a plurality of fingers (27, 28), a permanent magnet (29), and a coil (25). The fingers (27, 28) are arranged such that their distal ends generally face toward the poles (37, 38) on the first member. Each permanent magnet has a width that is greater than the pole spacing. Each arm is associated with one of a number of phases. The fingers of the arms within a particular phase are arranged such that they simultaneously align with respective poles when the first and second members are in one position relative to one another.

The fingers on the arms may be arranged such that when the fingers of a phase group are aligned with any of said respective poles then the fingers of any other phase group will not be aligned with any of said respective poles. Each permanent magnet may be arranged between certain fingers on the arm with which the permanent magnet is associated.

The coils may share a common terminal. The coils in one phase may be configured to be not wired to the coils in another phase. Each permanent magnet may be magnetized in the same direction relative to the first member. Each permanent magnet in a given arm may be magnetized in a direction opposite from a permanent magnet in an adjacent arm.

The number of phases may be two, three, four, five, or more. In a three-phase motor, the coils may be wired in a wye ("Y"), a delta, or a six-leadwire configuration. The three-phase motor may be configured to follow a six-state excitation sequence.

Each arm may include a portion formed of molded iron powder composite, solid soft magnetic steel, or electrical lamination material. Each finger may be configured to act as a salient pole. Each arm may have a plurality of permanent magnets. The number of poles may be at least two hundred and fifty. The arms may be connected by back iron (23).

The first member and the second member may be arranged to rotate relative to one another about an axis. The first member may move linearly relative to the second member.

The arms may be positioned substantially equidistantly along the second member. Each phase may have an equal number of arms associated with it. Each coil may be wound around its associated arm in the same direction relative to the first member. The first or second member may contain molded iron-powder composite, soft magnetic steel, or electrical steel lamination. The motor may be configured to be driven by a bipolar motor driver.

For the three-phase motor configuration, the fingers may be arranged such that when the centers of fingers in the first phase are aligned with an associated pole center, the centers of fingers in the second phase are substantially aligned with a leading edge of an associated pole by an offset, and the centers of the fingers in a third phase are substantially aligned with a trailing edge of an associated pole by an offset, where the offset may be less than the pole spacing.

The number of first member poles may be an odd integer.

In accordance with one aspect of this invention, the neighboring second member fingers are not associated with the neighboring salient first member poles, contrary to what had been thought to be required by the prior art. In some embodiments of the improved motor, two neighboring second member fingers are associated with two first member poles that are spaced apart by a number of first member poles. This enables the design of motors with a large number of rotor poles (e.g., 250, 300, or more) for small step sizes, yet that use reasonably-sized permanent magnets in between two neighboring second member fingers. With such a design, the magnet size may be larger than one second member finger pitch.

In accordance with another aspect of this invention, the magnetization directions of all the second member magnets may be in the same direction relative to the first member, contrary to the alternately-reversed magnetizations required in the prior art.

Another aspect of the invention is providing a motor capable of stepping in half the cardinal step interval without the use of a microstep driver.

In accordance with another aspect of this invention, other motors that utilize the design concepts of this invention are also possible, including: (a) sectional or fractional stepping motors, where only portions of an entire 360° stator and rotor are used; (b) stepping motors with reversed rotational and stationary members (i.e., where the inner stationary member is a stator, and the outer rotational member is a rotor); and (c) stepping motors with axial air gap(s), where the rotor and the stator, both in planar forms, are aligned side by side on a common axis.

In accordance with another aspect of this invention, bifilar windings and redundant windings can be easily implemented without departure from the concept of this invention. Further redundancy in motor design can be achieved, both mechanically and electrically, by using half the motor for the primary windings and half the motor for the redundant windings, without using two motors in a side-by-side style, to reduce size and weight.

In accordance with a further aspect of this invention, the use of solid soft magnetic steel(s) to fabricate a one-piece solid stator stack, or even to fabricate one-piece solid stator housings and stack to reduce manufacturing costs, can be implemented for low stepping rate applications where hysteresis and eddy current effects are minimal.

BRIEF DESCRIPTION OF THE DRAWINGS

FIG. 4A is an enlarged fragmentary detail view of a portion of FIG. 3, showing the rotor poles, physical windings, stator magnets, and the alignments of stator fingers and rotor poles.

FIG. 4B is an enlarged view of a portion of FIG. 4A, showing the alignment of the rotor poles and stator fingers.

FIG. 5 is a schematic electrical wiring diagram for the form shown in FIGS. 3 and 4.

DESCRIPTION OF THE PREFERRED EMBODIMENTS

Figure 3:
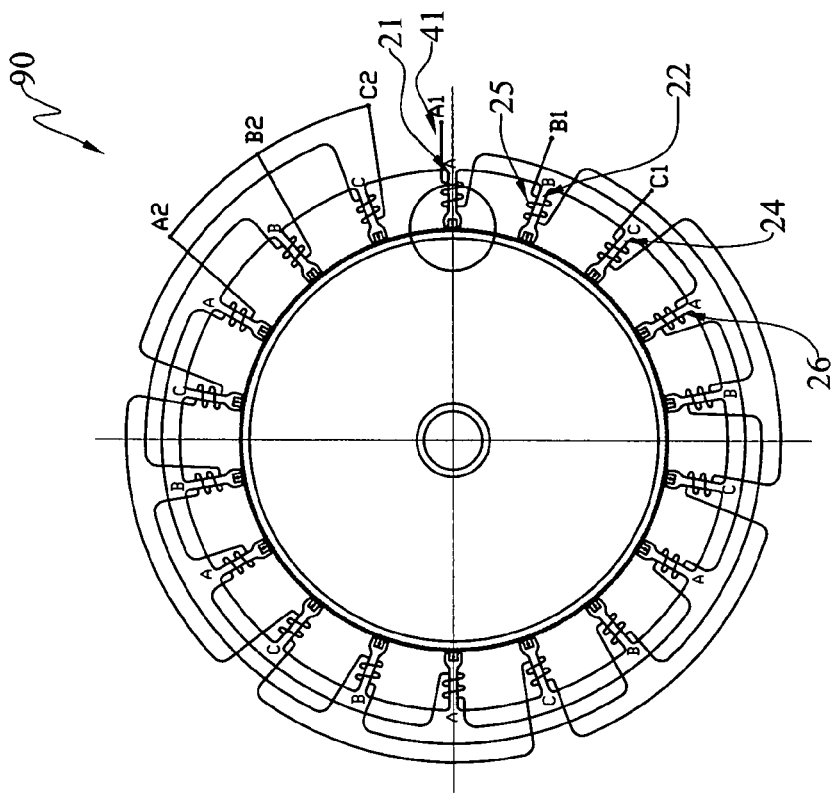
FIG. 3 is a schematic view showing the physical wiring diagram on the stator arms of the motor design shown in FIG. 1.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The present invention broadly provides improved motors having features and attributes drawn from variable reluctance-type stepping motors and permanent magnet-type stepping motors.

Figure 1:
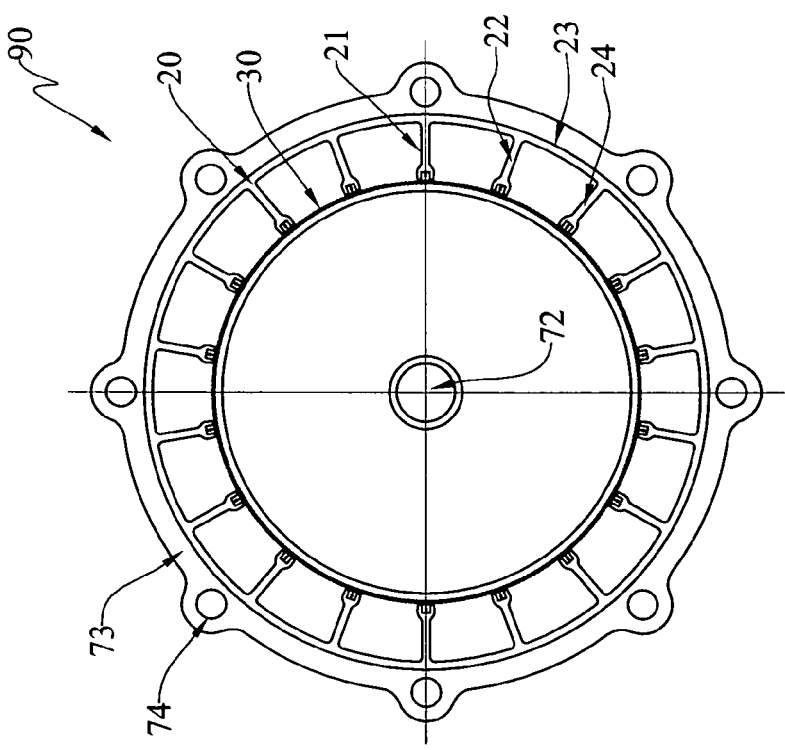
FIG. 1 is a schematic transverse cross-sectional view of a first form of a three-phase, bipolar, 0.20° per step motor design, having 300 rotor poles, 18 stator arms and 18 permanent magnets.

The improved motor broadly includes two members mounted for movement relative to one another. The two members may be arranged for rotational movement as depicted in FIG. 1 showing a first embodiment 90 having first member 30 and second member 20. In first embodiment 90, second member 20 configured as a stator, and is stationary. First member 30 is configured as a rotor and is mounted to rotate about the central axis designated at 72. The two members may also be arranged in other configurations to give a different type of relative movement, such as linear displacement. The second member may be formed of molded iron powder composite, solid soft magnetic steel(s), electrical steel lamination material(s), or a combination of these materials with or without additional support structure(s). Second member 20 has a number of arms, such as arm 22 and arm 24, arranged around its inner surface. The improved motor may be designed with different numbers of arms as depicted in the embodiments in FIGS. 2A and 2B. By varying the number of arms, the ratio of the motor running torque and motor detent torque can be adjusted. The motor shown in FIG. 2A has 36 stator arms and 36 permanent magnets, whereas the motor shown in FIG. 2B has only 9 stator arms and 9 permanent magnets. In the embodiment shown in FIG. 2A, there is less room for windings, but more permanent magnets than in the FIG. 1 embodiment. In the embodiment in FIG. 2B, however, there is more room for windings, but fewer permanent magnets than in the FIG. 1 embodiment. The second member arms are preferably spaced substantially equally about the second member.

As shown in FIG. 3, each of the second member arms has a coil or physical winding, such as coil 25 on arm 22. In this embodiment, there are three groups of arms, each arm labeled with an "A", "B", or "C". The individual groups of arms are also called phases or phase groups. The number of arms for each phase is preferably equal, so as to achieve electrical and performance balance among the phases. All the coils in one phase are electrically connected such that they are energized at the same time. For example, in embodiment 90, all of the A coils are connected in series. Winding wire 41 for the A phase starts at electrical terminal A1 and then winds around arm 21. Phase A winding wire 41 then skips over arms 22 and 24 and continues to wind around the next phase A arm, arm 26. Wire 41 continues to wind around every third arm in the same clockwise winding direction relative to first member 30. In other embodiments, the coils may be wound in alternating directions. The coils may be first wound on a mandrel and then transferred onto the arms. The windings for each of the phases may be electrically connected to share a common terminal. For example, in the embodiment shown in FIG. 3, there is a connection between A2, B2, and C2 (also depicted in FIG. 5 as a three-leadwire wye ("Y")-connection). Alternatively, the phases of a three-phase embodiment may be connected in a three-leadwire delta-connection. The phases may be arranged with no connection among the phases, yielding two leadwires for each phase, such as a six-leadwire configuration for a three-phase embodiment.

Figure 2A:
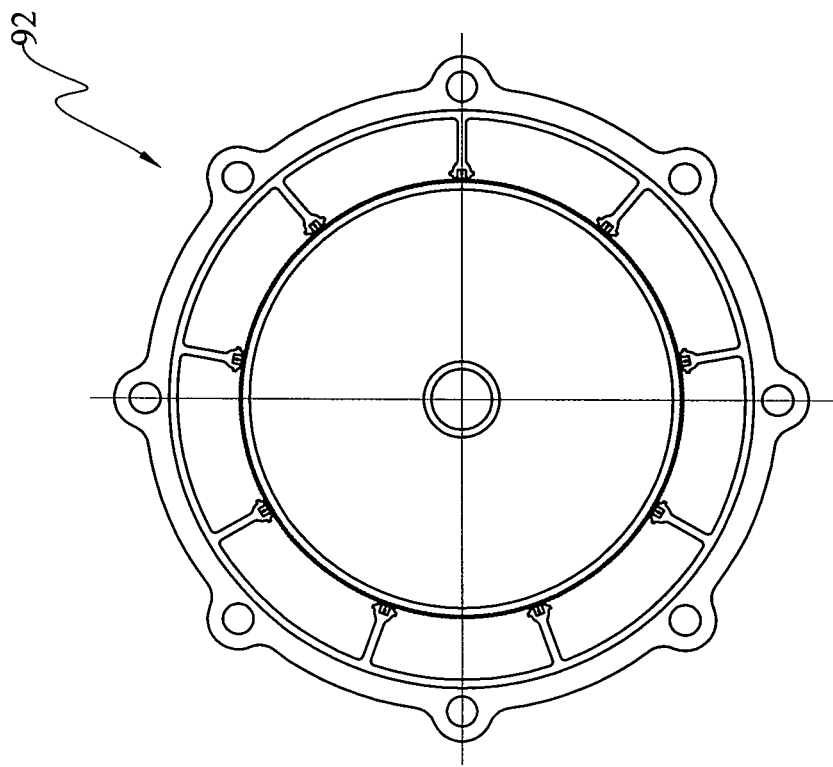
FIG. 2A is a schematic transverse cross-sectional view of another form of a three-phase, 0.20° per step motor design, this embodiment having 300 rotor poles, 36 stator arms and 36 permanent magnets.
Figure 2B:
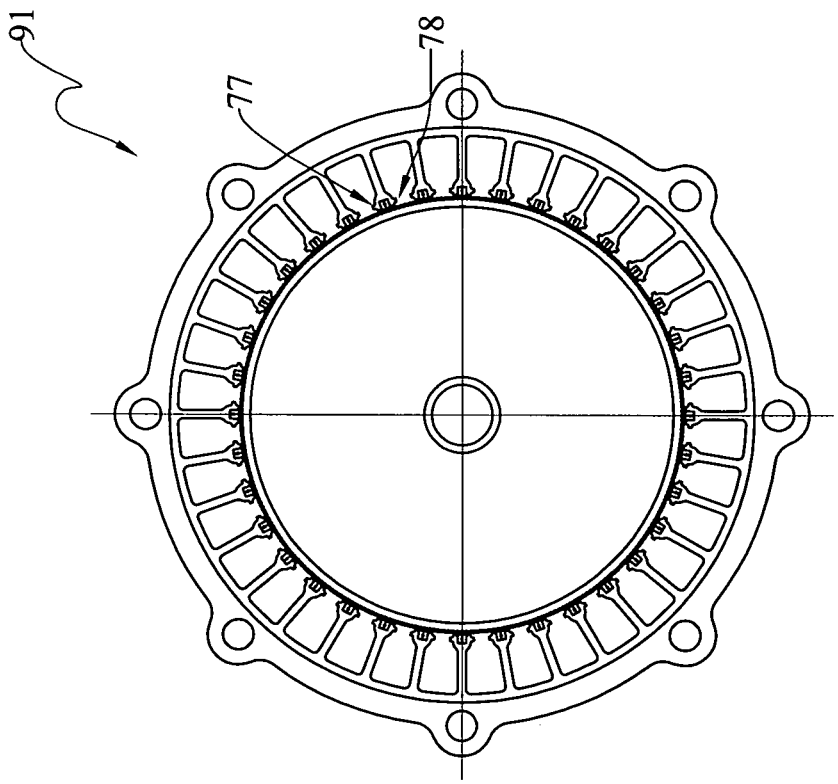
FIG. 2B is a schematic transverse cross-sectional view of another form of a three-phase, 0.20° per step having 300 rotor poles, 9 stator arms and 9 permanent magnets.

FIG. 4A shows an enlarged view of the lower right quadrant of the motor shown in FIG. 1. FIG. 4B is a further enlarged view of a stator arm and rotor poles in FIG. 4A. Along one surface of the first member 30, a number of poles are arranged, such as poles 32, 34, 37, and 38. A pole is generally defined as a region of magnetic permeability greater than 1. The first member poles are equally spaced and are of an identical shape. In embodiment 90, the poles are generally rectangularly-shaped protrusions on the first member extending towards the second member, with a slot in between two neighboring poles. Alternate slot shapes (e.g., chamfered, square, round, oval, etc.), that may better assist the magnetic flux flow are not illustrated herein, as they are contemplated as would normally occur to one skilled in the art to which this improved motor relates. In FIGS. 2A and 2B, there are two ears shown on each stator arm. These ears provide a mechanical feature for securing the windings inside the slots.

The first member may be formed of molded iron powder composite, solid soft magnetic steel(s), electrical lamination material(s), or a combination of these materials with or without additional support structure(s). The first member may be made in a single piece of such material(s). The first member may be also made with a sleeve of such material(s) that are supported with a light frame to reduce first member weight and inertia.

Each arm has a number of fingers arranged to face toward the rotor poles. The distal end of the finger is defined as the end of the finger closest to the first member. Fingers are broadly defined as protruding regions of magnetic permeability greater than 1 on the arms. For example, in embodiment 90 shown in FIG. 4A, each arm has two fingers, arm 26 having fingers 27 and 28, arranged to face toward first member poles 37 and 38 respectively. Each arm also has at least one permanent magnet associated with it. In embodiment 90 in FIGS. 4A and 4B, each arm has one permanent magnet, such as permanent magnet 29, arranged between its two fingers.

The fingers are spaced along the arms such that the center of each of the fingers in a given arm will align with the center of a respective rotor pole at the same time. For example, finger 53 aligns with pole 33 at the same time that finger 51 aligns with pole 31. Additionally, the fingers in all the arms of a given phase are spaced such that they all align with a respective first member pole at the same time. For example, in FIG. 4A, when the fingers of phase A arm 26 are aligned with poles 37 and 38, the fingers of phase A arm 21 are aligned with poles 31 and 33.

The arms in one phase will typically have their fingers at different alignment offsets than the fingers in other phases. As the first member moves relative to the second member, the fingers for each phase will sequentially come into alignment with respective poles.

For example, as shown in the three-phase embodiment shown in FIG. 4A, when the phase A fingers are aligned with poles, each phase B and phase C finger will be out of alignment with respective poles. The phase B fingers have a counter-clockwise offset relative to the closest first member pole while the phase C fingers have a clockwise offset relative to their closest pole. As first member 30 rotates clockwise in steps, the fingers for phase C will come into alignment with respective poles in two steps, and the fingers for phase B will come in alignment with respective poles in two more steps.

The number of second member arms, permanent magnets and fingers on each arm will affect the motor detent torque, the motor running torque, and the winding resistance.

The pole and finger spacing can be defined in terms of pitch. In a rotary motor, the first member pole pitch is the surface width at the first member outer diameter of two neighboring first member pole centers. For linear stepping motors, the first member pole pitch is the linear distance between two neighboring rotor pole centers. Poles are spaced along the first member at each consecutive integer multiple of the pole pitch.

For linear stepping motors, the stator finger pitch equals to the rotor pole pitch. For rotary motors, the finger pitch will be in linear proportion to the pole pitch so that the poles and fingers align. The finger pitch is the product of the first member pole pitch multiplied by the ratio of the second member (stator) inner diameter to the first member (rotor) outer diameter at the motor air gap.

$$\text{Stator finger pitch} = \text{rotor pole pitch} \times \frac{\text{rotor outer diameter}}{\text{rotor inner diameter}} \quad [\text{Eq. 1}]$$

Figure 12:
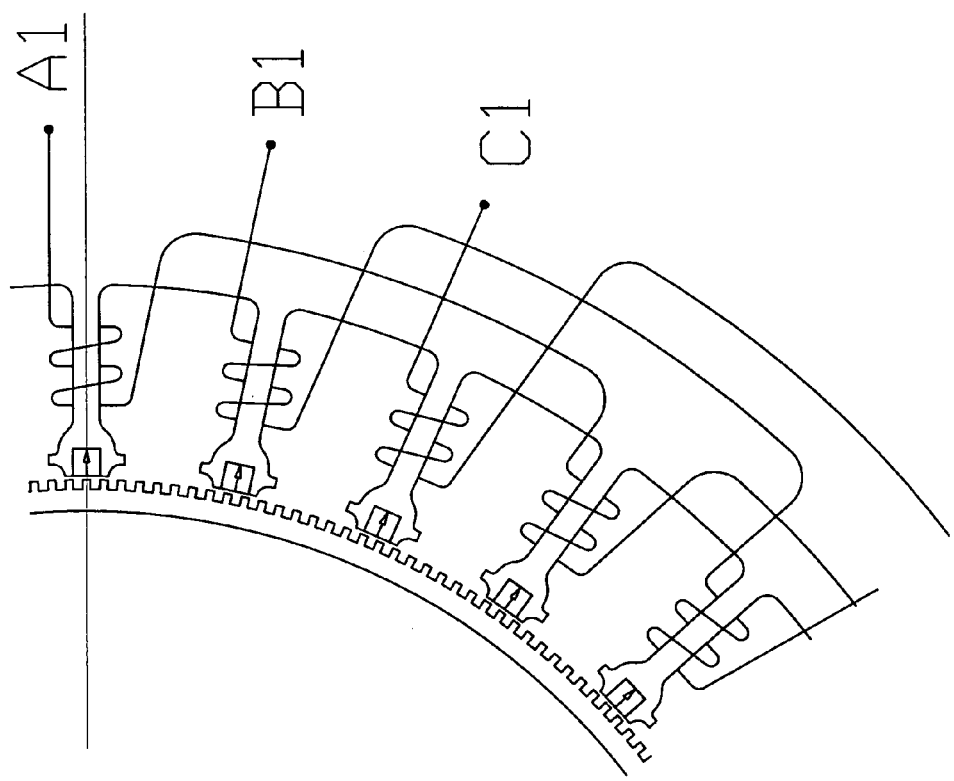
FIG. 12 is a fragmentary enlarged detail view of a portion of the structure shown in FIG. 11, showing the rotor poles, physical windings, stator magnets, and the alignments of stator fingers and rotor poles.

Unlike the first member poles, the fingers in an arm might not be spaced at consecutive integer multiples of the finger pitch, but may skip multiple positions to accommodate magnet width. For example, in FIG. 4B, fingers 51 and 53 are placed with a separation of three times the finger pitch. The magnet width is larger than one finger pitch, but smaller than three finger pitches. In FIG. 12, however, the magnet width is designed to accommodate two finger pitches. Therefore, the permanent magnet width may be larger than one finger pitch. This is a feature that distinguishes this improved motor from the prior art which requires magnet width less than one finger pitch.

The number of first member poles is designed as a function of a constant, the number of phases, and a desired step interval. The number of first member poles for a bipolar motor driver must be a whole even or a whole odd integer determined from the equation:

$$\text{cardinal step angle} = \frac{360°}{(\text{no. of phases}) \times (\text{no. of rotor poles})}, \quad [\text{Eq. 2}]$$

where the cardinal step angle is defined as the angle between two neighboring cardinal detent positions. The use of first member poles in either an even integer or an odd integer configuration is another feature that distinguishes this improved motor from the prior art which requires an even integer number of rotor poles.

Table 1 lists some selected first member pole number, cardinal step angle, and phase relationships for bipolar motor drivers calculated according to Equation 2. Fractional cardinal step angles are inevitable in the calculations, but can be avoided for practical reasons, such as machining or technical accuracy of fractional angles.

TABLE 1

| Pole No. | Phase No. | | | |
|---|---|---|---|---|
| | 2 | 3 | 4 | 5 |
| 100 | 1.8 | 1.2 | 0.9 | 0.72 |
| 120 | 1.5 | 1 | 0.75 | 0.6 |
| 125 | 1.44 | 0.96 | 0.72 | 0.576 |
| 150 | 1.2 | 0.8 | 0.6 | 0.48 |
| 160 | 1.125 | 0.75 | 0.5625 | 0.45 |
| 180 | 1 | 0.6666667 | 0.5 | 0.4 |
| 200 | 0.9 | 0.6 | 0.45 | 0.36 |
| 225 | 0.8 | 0.5333333 | 0.4 | 0.32 |
| 250 | 0.72 | 0.48 | 0.36 | 0.288 |
| 300 | 0.6 | 0.4 | 0.3 | 0.24 |
| 375 | 0.48 | 0.32 | 0.24 | 0.192 |
| 400 | 0.45 | 0.3 | 0.225 | 0.18 |
| 500 | 0.36 | 0.24 | 0.18 | 0.144 |

In embodiments 90 through 93, each permanent magnet is oriented in the direction pointing radially outwardly from the central rotational axis. Alternatively, each magnet can be oriented in the direction pointing radially inwardly from the center rotational axis. The ability to have all permanent magnets in the same orientation is different from the prior art, which required alternating permanent magnet orientations. The number of stator arms can be an even whole integer or an odd whole integer. When using a bipolar multistate driver, the step angle will be half of a cardinal step angle determined from Equation 3:

$$\text{step angle} = \frac{1}{2} \times \text{cardinal step angle} \quad [\text{Eq. 3}]$$

This step angle is yet another feature that distinguishes this improved motor from the prior art. The improved motor achieves microstepping in half of a cardinal step angle without a microstep driver.

In embodiment 94, the stator magnets on the neighboring stator arms are magnetized in alternating directions, inwardly and outwardly in reference to the motor center rotational axis. The number of stator arms can only be an even whole integer for the obvious reason to allow the same numbers of arms with inward magnetization direction and outward magnetization direction. Embodiment 94 may be driven with a bipolar multistate driver such that the step angle will be the same as a cardinal step angle:

$$\text{step angle} = \text{cardinal step angle} \quad [\text{Eq. 4}]$$

Four different forms of the stepping motors with small step intervals are disclosed herein. A first form is disclosed in FIGS. 1-8, a second form in FIG. 9, a third form in FIGS. 10-12, and a fourth form in FIGS. 13-14.

These various examples show three-phase implementations which have arms with one or more permanent magnets sandwiched in between two or more fingers. The examples also show motor excitation sequences and windings with three-leadwire configurations that are commonly used in variable reluctance-type, hybrid-type, and permanent magnet-type stepping motors.

Although only 300- and 250-pole rotors are illustrated herein for three-phase stepping motors, motors with different numbers of poles and phases (e.g., those listed in Table 1), are easily understood by those who are skilled in the art.

First Form (FIGS. 1-8)

FIG. 1 shows a cross-sectional view of a three-phase, 0.20° per step (i.e., 0.40° cardinal step size), bipolar stepping motor with 300 identical rotor poles, 18 equally-spaced stator arms, and 18 permanent magnets sandwiched in between the two stator fingers on each stator arm. The generic mounting flange and the generic mounting holes on the stator and the shaft on the rotor are common to all motors illustrated herein. The stator and mounting flange, which are also common to all other motors disclosed herein, can be made with molded iron powder composites or solid soft magnetic steels in one piece for low stepping rate applications. It can also be laminated with electrical steel lamination materials and/or mounted inside a structural housing for high stepping rate applications.

FIGS. 2A and 2B shows two design variations for the same stepping motor. The motor shown in FIG. 2A has 36 stator arms and 36 permanent magnets, whereas the motor shown in FIG. 2B has only 9 stator arms and 9 permanent magnets. FIG. 3 shows the physical wiring diagram for the coils in the stator arms in a wye ("Y")-connection, as shown in FIG. 5. Since there are 18 stator arms and three-phases, each phase has six serially-connected coils.

FIG. 4A shows an enlarged view of a section in FIG. 3, showing the rotor poles, physical windings, stator magnets, and the alignments of stator fingers and rotor poles. FIG. 4B is a further enlarged view of a portion of stator arm 21 along with the associated rotor poles. The magnet width illustrated in FIGS. 4A and 4B is greater than one stator finger pitch, but less than three stator finger pitches.

Figure 6:
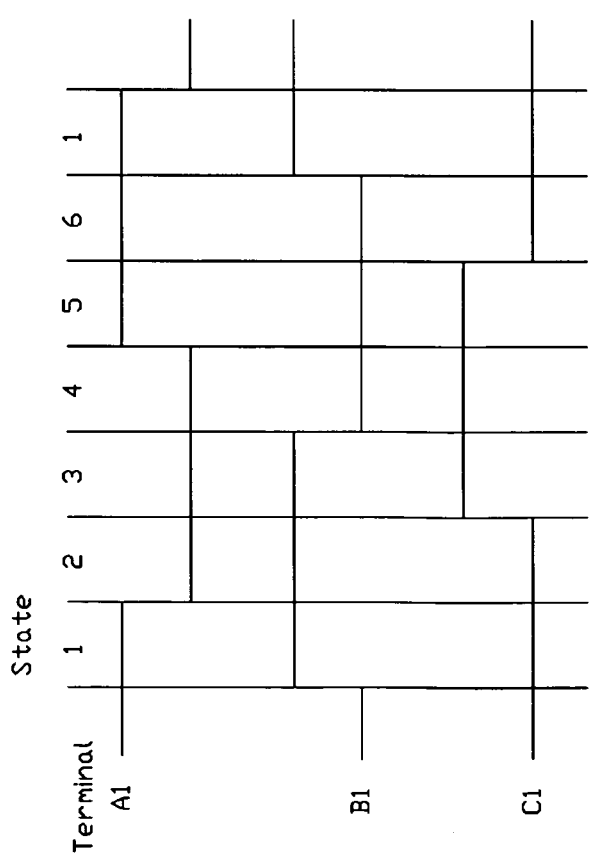
FIG. 6 shows the square excitation waveforms, excitation sequences, energization states, and rotation directions for the stepping motor designs shown in FIGS. 1-5.

The improved motor may be driven with several types of drivers. For example, the improved motor may be driven with a bipolar multistate driver. FIG. 6 shows the square excitation waveforms, excitation sequences, and rotation directions for a six-state bipolar driver for the three-phase step motor designs shown in FIGS. 1-5. For the embodiments in FIGS. 1-5, excitation in the order from states 1 through 6 will result in rotor rotation in the clockwise direction. Reversal of the excitation sequence will result in rotor rotation in the opposite direction. Similarly, reversal of winding direction on each stator arm to the opposite direction, will result in the reversal of the direction of rotor rotation.

Figure 7B:
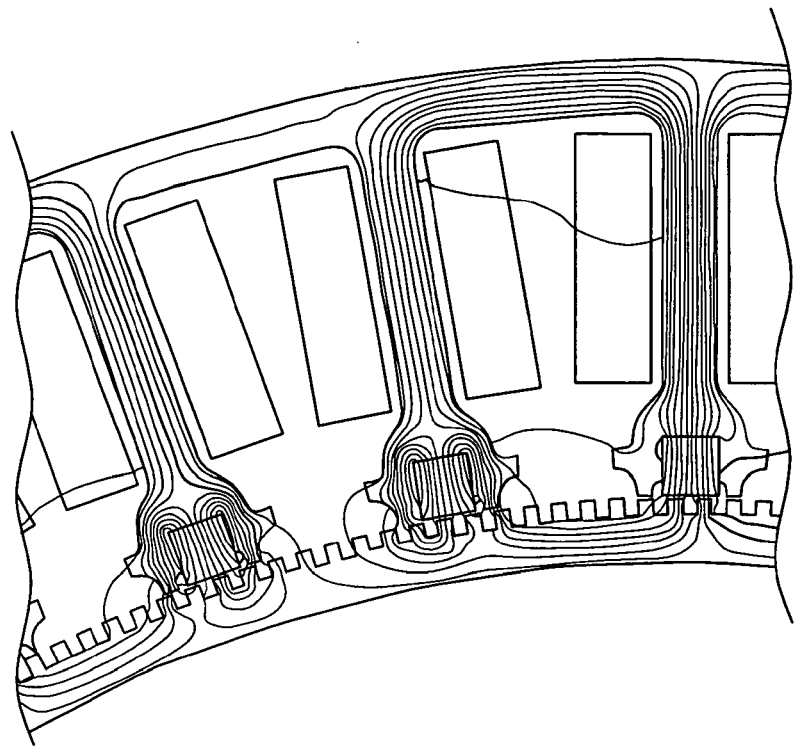
FIG. 7B is a fragmentary schematic view of the magnetic flux distributions with power being supplied to the windings, based on a finite-element analysis model of the stepping motor design shown in FIG. 2A.
Figure 7A:
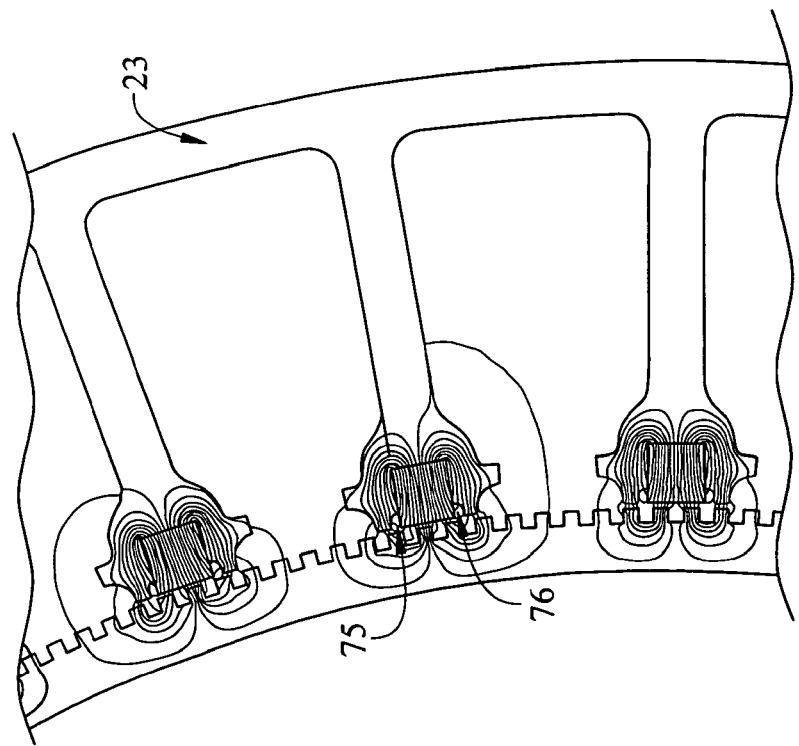
FIG. 7A is a fragmentary schematic view of the magnetic flux distributions, without windings or without power being supplied to the windings, based on a finite-element analysis model of the stepping motor design shown in FIG. 2A.

FIGS. 7A and 7B show two cases of magnetic flux distribution based on a finite-element analysis model for a section in FIG. 2A. When there is no winding or the windings are unpowered and in open circuit, as shown in FIG. 7A, the arms and stator back iron 23 carry minimal magnetic flux lines. Most magnetic flux lines are self-contained, and form closed loops among the stator fingers, stator magnets and rotor poles. However, when power is applied to the windings, magnetic flux lines generated by the windings will either add or cancel the magnetic flux lines generated by the stator magnets, depending on the excitation state. A net rotational torque is generated depending upon the motor position and excitation state. The torque generated by each excitation state as a function of the rotation angle is evaluated by conducting a finite-element analysis of the flux at numerous angles of rotation for each excitation state. For example, FIG. 7B represents the flux distribution for an excitation state at a given rotor angle. As further demonstrated in FIG. 7B, the geometry of each finger helps to redirect the magnetic flux flow from the fingers to the first member poles. Cut-outs, such as 75 and 76, may be placed by the fingers to help control their shape and flux distribution.

Figure 8:
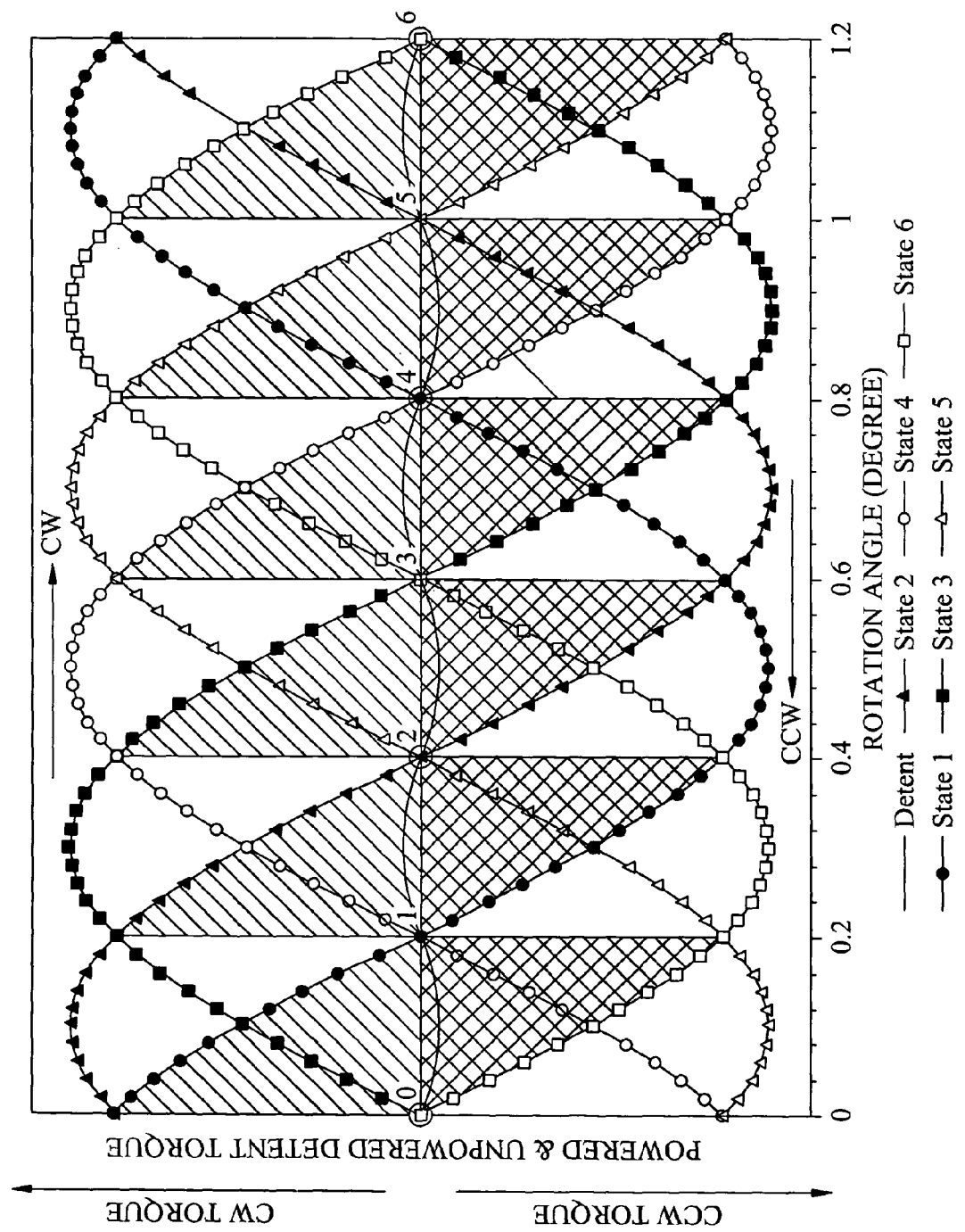
FIG. 8 is an illustrative plot of torque (ordinate) vs. rotation angle (abscissa), and depicts the schematic unpowered and powered detent torque profiles for the stepping motor designs shown in FIGS. 1-5, when energized as per FIG. 6.

FIG. 8 illustrates the unpowered and powered torque as a function of rotor rotation for each state in three-phase rotary designs such as those in FIGS. 1-4. The unpowered detent torque is the torque when all the motor windings are unpowered and in open circuit. The waveforms for the unpowered detent and powered detent profiles are illustrative, and are not restrictive in character for torque development. Actual waveforms may have high-order harmonics superimposed with the sinusoidal waveforms. There are total seven powered detent positions (zero-crossing points) shown in FIG. 8, four marked with large circles on the abscissa (i.e., at positions marked with "0", "2", "4" and "6"), and three unmarked (i.e., at positions marked with "1", "3" and "5"). The four circle marked positions are also cardinal detent positions at 0.40° per step spacing. The cardinal detent positions are the stop-and-hold positions of the motor. Each of the states' powered torque is plotted as a function of the rotation angle. The shaded areas on the upper portion of the plot (above the abscissa) show the torque at the six states from State 1 through State 6 as the rotor rotates in the clockwise direction. The double-shaded areas on the lower portion of the plot (below the abscissa) show the torque at the six states in the reverse rotation direction from State 6 through State 1 when the rotor rotates in the counterclockwise direction.

When the motor is suddenly powered off while running, the motor will only stop and hold at one of the four cardinal detent positions that are marked with circles (i.e., at positions marked with "0", "2", "4" and "6"). It will pull back from one of the three unmarked detent positions (powered detent positions; i.e., at positions marked with "1", "3" and "5") to one of the marked detent positions to stop and hold due to the motor load torque or hysteresis from rotor, stator or both. It is also possible that a large load inertia could force the motor moving forward from one of the three unmarked detent positions to one of the marked detent positions to stop and hold. Thus, if the starting position is count "0", the step counts in even numbers are the motor cardinal detent positions, or the stop-and-hold positions; whereas, the counts in odd numbers are the powered detent positions.

The first form motor design has 900 cardinal detent positions in one full rotation, but will require 1800 steps to complete one full round of rotation.

Second Form (FIG. 9)

The second form of the improved motor shares the same rotor as the first form and thus has 900 cardinal detent positions in one full rotation, but will require 1800 steps to complete one full round of rotation.

Figure 9E:
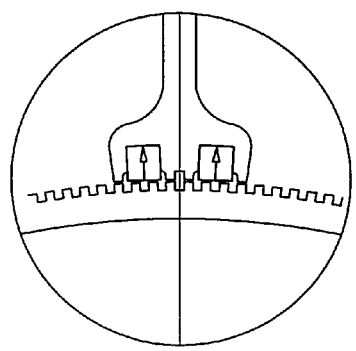
FIG. 9A-9F are enlarged detail views of a second form of the stator arm designs.
Figure 9F:
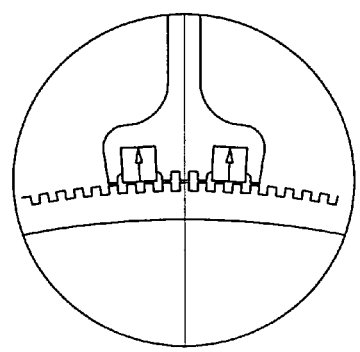
Figure 9C:
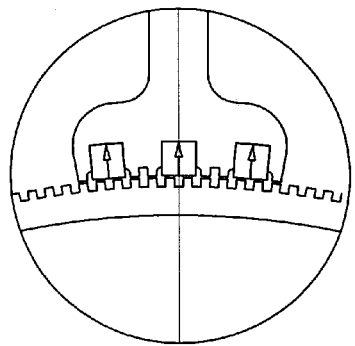
Figure 9D:
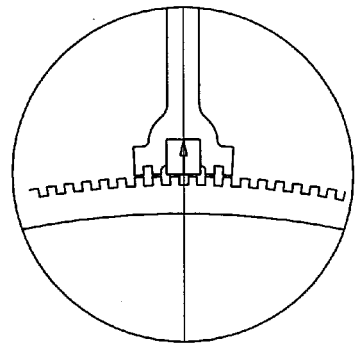
Figure 9A:
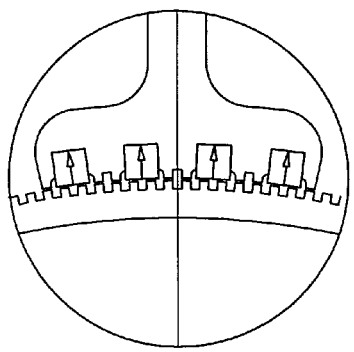
Figure 9B:
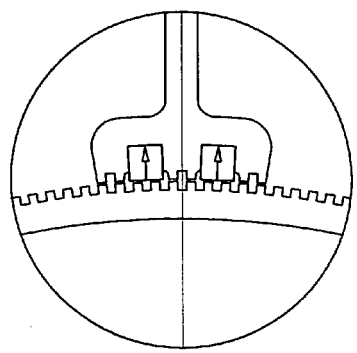

FIGS. 9A-9F show six examples of enlarged schematic cross-sectional views of stator arm designs in comparison with the circled stator arm in FIG. 4B of the first form of the invention. Each example shows a different form of the stator arm, stator magnet(s), stator fingers, and the alignment of rotor poles and stator fingers. FIG. 9A shows a stator arm with two stator magnets. Each magnet width is larger than one finger pitch, but smaller than three finger pitches. The two magnets are separated by two stator fingers with a slot in between. Alternate slot shapes (e.g., chamfered, square, round, oval, etc.), that may better assist the magnetic flux flow are not illustrated herein, as they are contemplated as would normally occur to one skilled in the art to which this improved motor relates. Each stator finger has a cutout so that to avoid overlap among stator fingers and rotor poles for better alignments. FIG. 9B shows three stator fingers separating the two magnets. FIG. 9C increases the two magnets in FIG. 9A to three, and FIG. 9E increases the number of stator magnets into four. FIG. 9D has more stator fingers on either side of the magnets than those shown in FIGS. 9A and 9B. Similarly, FIG. 9F has an additional finger on either side of each magnet than those shown in FIG. 9A.

These examples are illustrative and not restrictive in character. They demonstrate how the first form of the improved motor can be expanded to the use of one or more stator magnets per stator arm. There can be one or more stator fingers separating or sandwiching the stator magnets. Each permanent magnet is oriented in the direction pointing radially outwardly from the central rotational axis. Alternatively, each magnet can be oriented in the direction pointing radially inwardly from the center rotational axis. The combination of the number of magnets, number of stator fingers, and number of stator arms can be more than those demonstrated in FIG. 9, without departure from the spirit of the first and the second forms of the embodiments. Elements of the second form of the embodiment can also be applied to the following embodiments described.

For the same motor size, the number of stator magnets will change the ratio of motor running torque and motor detent torque. For applications where high running to detent torque ratio is required, the number of the stator magnets or the amount of magnet material (magnet size) needs to be reduced. Conversely, for applications where high detent torque is required, more stator magnets or an increased amount of magnet material will be necessary in the stator arm design.

Figure 11:
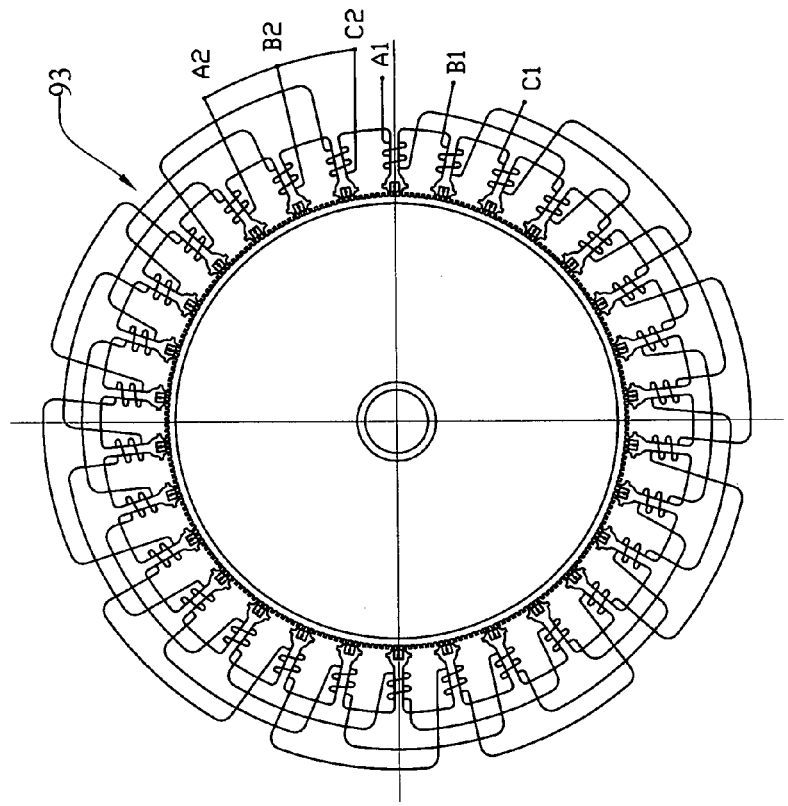
FIG. 11 is a schematic physical wiring diagram for the stepping motor design shown in FIG. 10.
Figure 10:
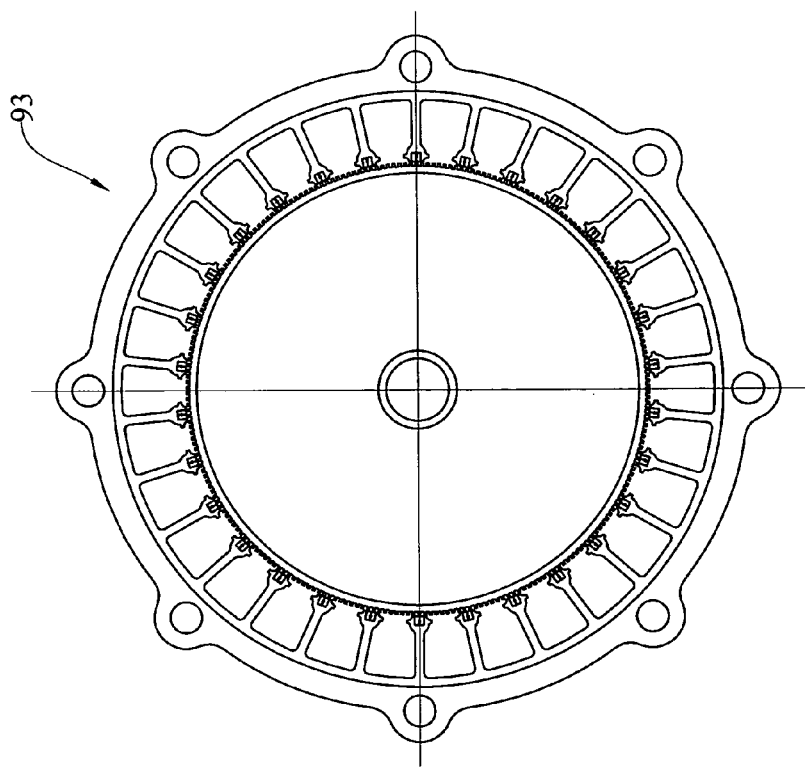
FIG. 10 is a schematic transverse cross-sectional view of a third form of a three-phase, bipolar, 0.24° per step motor design, having 250 rotor poles, 30 stator arms and 30 stator magnets.

Third Form (FIGS. 10-12)

FIG. 10 is a schematic cross-sectional view of a third form of a three-phase, bipolar, 0.24° per step (i.e., 0.48° cardinal step size) motor design with 250 rotor poles, 30 stator arms and 30 stator magnets. A schematic physical wiring diagram for the step stepping motor is shown in FIG. 11 in a wye ("Y")-connection. The electrical diagram is shown in FIG. 5. An enlarged detail view of a portion of the structure in FIG. 11 is further shown in FIG. 12 for the rotor poles, stator magnets, stator arms, physical wirings on the stator arms, and the alignments of the stator fingers and rotor poles. The third form has 750 cardinal detent positions will require 1500 steps to complete one full round of rotation.

The magnet width is such that for each phase A stator arm, there is one rotor pole in between the two rotor poles that are aligned with the two stator fingers. Therefore, the magnet width is greater than one finger pitch, but less than two finger pitches. This compares to the two rotor poles in FIG. 4B that are sandwiched in between the two rotor poles that are aligned with the phase A stator fingers. Due to the width of the magnet in the illustration is what is needed in between the two stator fingers, there is no overlap and no need for cut-outs on the stator fingers as opposed to those shown in FIGS. 4A, 4B, 7, and 9.

When the phase A stator fingers align with the rotor poles, each of the phase B or phase C stator fingers will align with the associated rotor poles with an offset at either the leading or trailing edges. Thus, three distinctly-aligned arm groups, one for each phase, are created in relation to the rotor poles. The thirty equally-spaced stator arms are, therefore, ten repetitions of the three distinctly-positioned stator arms.

Figure 13:
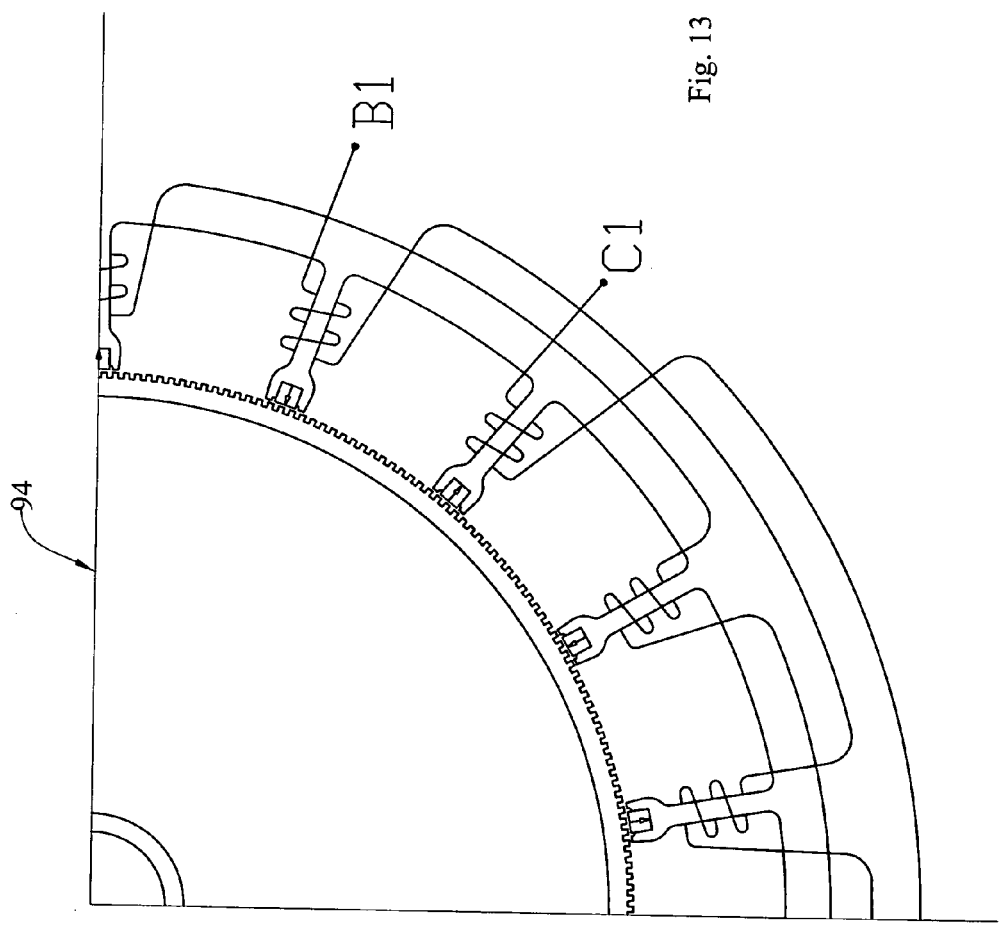
FIG. 13 is a schematic transverse cross-sectional view of another form of the improved motor having magnets in alternating orientations.
Figure 14:
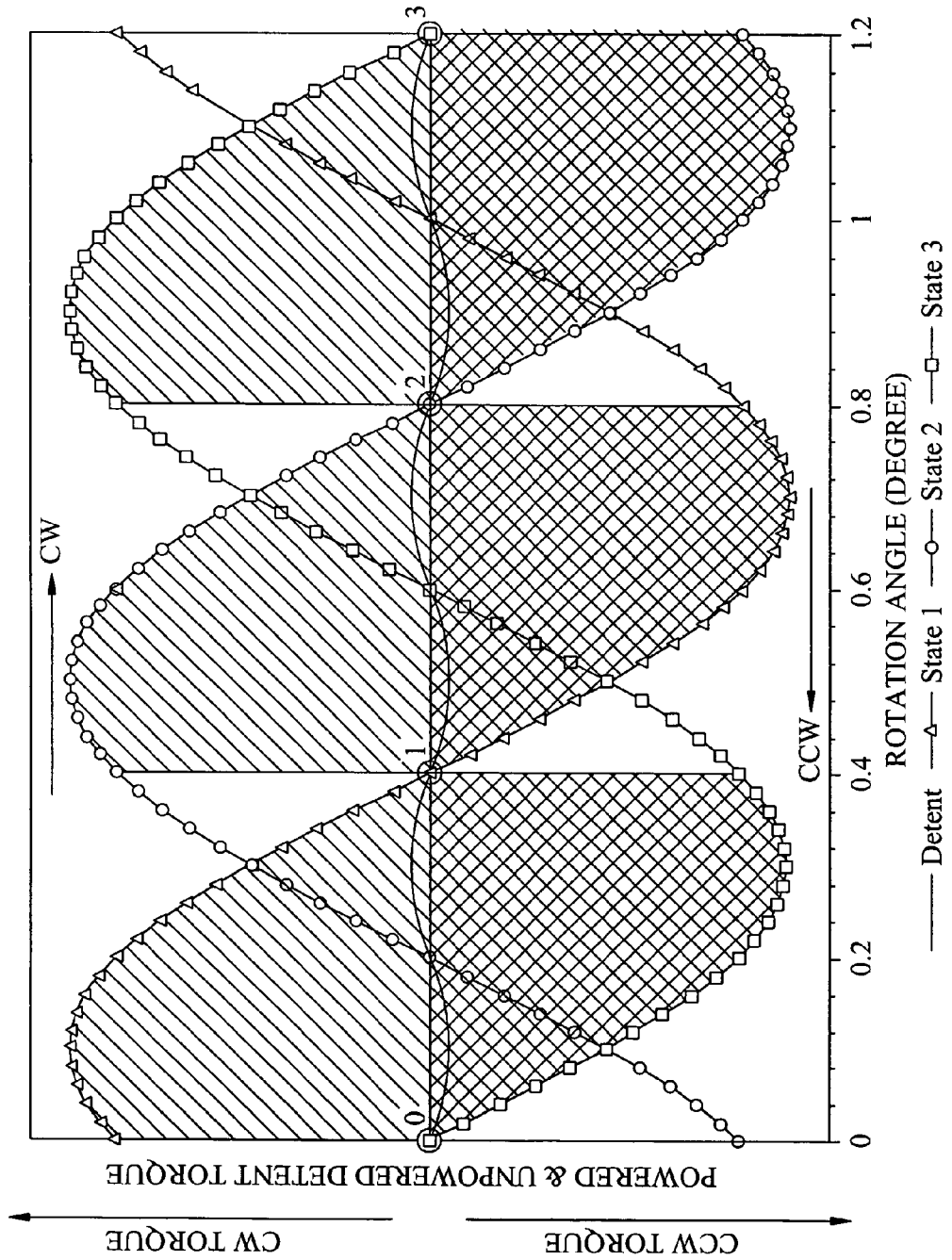
FIG. 14 is a illustrative plot of torque (ordinate) vs. rotation angle (abscissa), and depicts the schematic unpowered and powered detent torque profiles for the stepping motor designs shown in FIG. 13, when energized with a three state driver.

Forth Form (FIGS. 13 and 14)

FIG. 13, an enlarged view of the motor's lower right quadrant, represents an embodiment similar to that shown in the first form in FIGS. 1 and 3 with the exception of the magnetization directions for the magnets on the stator arms. The stator magnets on the neighboring stator arms are magnetized in the alternative directions inwardly and outwardly in reference to the motor center rotational axis. The physical windings will be the same as shown in FIG. 3, where the winding direction for all stator arms in each phase group shall be in the same clockwise or counter-clockwise direction relative to the first member.

The designs in the second form in FIGS. 11 and 12 could similarly be implemented with reversed magnetization directions for the magnets on the neighboring arms. When more than one magnet is used per stator arm, as shown in the second form in FIGS. 9A through 9C, 9E and 9F, all magnets on each stator arm shall be magnetized in the same inward or outward direction.

FIG. 14 illustrates how the stepping motor designs with alternating magnetizations, as illustrated in the partial view in FIG. 13, may develop torque in each state when using a three state driver. The waveforms for the unpowered detent and powered detent profiles are illustrative, and are not restrictive in character for torque development. Actual waveforms may have high-order harmonics superimposed with the sinusoidal waveforms as shown in FIG. 14.

The unpowered detent profile is the same as that shown in FIG. 8 for the design in FIGS. 1 and 3. There are total four powered detent positions (zero-crossing points) at 0.40° per step spacing, as marked with large circles on the abscissa (i.e., at positions marked with "0", "1", "2" and "3"). Those four powered detent positions coincide with the four cardinal detent positions. Therefore, the motor will step at the full cardinal step size of 0.4° per step. The design in FIG. 13 with 900 cardinal detent positions will require 900 steps to complete one full round of rotation.

Similarly for the design in the third form in FIGS. 10 and 11, when the stator magnets on the neighboring stator arms are magnetized in the alternative directions inwardly and outwardly in reference to the motor center rotational axis, the cardinal detent positions will coincide with the powered detent positions at 0.48° spacing. The motor will step at the full cardinal step size of 0.48° per step and require 750 steps to complete one full round of rotation.

When using a three state driver, repetition of the three excitation states will result in continuous rotation of the motor. Commonly used stepping motor drivers that have six-state excitation sequences, as shown in FIG. 6, may be used to drive the motor as a three-state driver.

All of the above examples in the described embodiments show that the stator arms are equally spaced, and the numbers of stator arms are in integer multiples of the number of phases. However, stepping motors can be designed with stator arms that are not equally spaced, or in numbers of stator arms that are not integer-multiples of the number of phases, as long as the first member pole and second member finger alignments are as described. However, unequally-spaced stator arms may produce uneven peak unpowered and powered detent torques, reduce motor torque density, and waste valuable winding spaces.

A linear stepping motor that utilizes the design concepts of the above examples may be implemented. By opening up a rotary stepping motor and straightening the stator and rotor, a rotational stepping motor becomes a linear stepping motor. Although Equation 1 is not applicable to linear embodiments, the alignment among second member fingers and first member poles, electrical wiring diagrams, excitation polarity sequences, and Equations 2 through 4 remain the same as those disclosed herein for rotational stepping motors.

Several other variations of stepping motor designs based on the principles of these embodiments are not shown herein. These include: (a) sectional or fractional stepping motors, where only portions of the entire 360° stator and rotor are used; (b) stepping motors with reversed, rotational and stationary members, where the inner stationary member is a stator and the other rotational member is a rotor; (c) stepping motors with axial air gap(s), where the rotor(s) and the stator (s), both in planar forms, are aligned side by side on a common axis; and (d) stepping motors driven with a microstep driver. In comparison with the circular and radial air gaps in the first through third forms, the axial air gap designs require axial magnetization directions for the magnets instead of radial directions in the first through forth forms, and the stator arms and fingers arranged to face toward the rotor poles in the axial directions. In these design variations, the winding schemes and the alignment of stator fingers and rotor poles will remain the same as those discussed above for three-phase motors.

Bifilar windings and redundant windings are yet other features that can be easily implemented for all the above winding schemes. A further redundancy in motor design can be achieved, both mechanically and electrically, by using half the motor for the primary windings and half the motor for the redundant windings, without using two motors in a side-by-side style to reduce size and weight.

Use of solid soft magnetic steel(s), to fabricate one-piece solid stator stack with arms and fingers, or even to fabricate one-piece solid stator housings, stack, arms and fingers, is yet another feature that can be implemented for low stepping rate applications for the improved motors disclosed herein. Solid soft magnetic steels may include, but are not limited to, molded iron-powder composite materials, low carbon steels (e.g., American Iron and Steel Institute (AISI) designated 1010, 1015, or 1018 steel, etc.), solid martensitic corrosion-resistant steels (such as 416 stainless steel, etc.), or solid high-permeability nickel-iron or iron-cobalt alloys (such as Hyperco® 50, etc.), etc. Those solid soft magnetic steels are distinguished from the commonly used electrical steel lamination materials (e.g., AISI M-15, M-19, etc.), or high-permeability nickel-iron or iron-cobalt alloys, etc. for high-frequency magnetic circuit applications. Those solid soft magnetic steels are known to magnetic designers for low frequency applications where eddy currents and hysteresis losses are insignificant. This feature has proven to be extremely useful for low stepping rate motors and actuators, because it eliminates lamination stacking process and delamination problems, cuts down costs (specially when using common 1018 low-carbon steel or 416 stainless steel), and simplifies fabrication processes.

Based on the descriptions above, the improved motor has illustrated how a motor can be design with small step sizes for use with a common bipolar motor driver. While a number of embodiments of the stepping motors with small step sizes have been shown and described, and certain changes and modifications thereto discussed, persons skilled in this art will readily appreciate that various additional changes and modifications may be made without departing from the spirit of the invention, as defined and differentiated in the following claims.

What is claimed is:

1. A motor, comprising:
a first member;
a second member;
the members being mounted for movement relative to one another;
the first member having a plurality of poles;
the poles being spaced substantially equidistantly along the first member;
the second member having a plurality of arms;
each arm having a plurality of fingers, a monolithic permanent magnet positioned along the first member between at least two of the fingers, and a coil;
the fingers having distal ends arranged to generally face toward the poles;
each permanent magnet having a width that is greater than the finger pitch;
wherein each arm is associated with one of a number of phases; and
wherein the fingers of the arms within a particular phase are arranged to simultaneously align with respective poles when said members are in one position relative to one another.

2. The motor of claim 1, wherein the fingers are arranged such that when the fingers on the arms of one phase group are aligned with any of said respective poles then the fingers of any other phase group will not be aligned with any of said respective poles.

3. The motor of claim 1, wherein all the coils share a common terminal.

4. The motor of claim 1, wherein the coils in one phase are not wired to the coils in another phase.

5. The motor of claim 1, wherein each permanent magnet is magnetized in the same direction relative to the first member.

6. The motor of claim 1, wherein each permanent magnet in a given arm is magnetized in a direction opposite from a permanent magnet in an adjacent arm.

7. The motor of claim 6, wherein each coil is magnetized in a direction opposite the coil in an adjacent arm.

8. The motor of claim 1, wherein the number of phases is three.

9. The motor of claim 8, wherein the coils are wired in a wye ("Y"), a delta, or a six-leadwire configuration.

10. The motor of claim 8, wherein the arms are configured to follow a six-state excitation sequence.

11. The motor of claim 8, wherein the fingers are arranged such that when the centers of the fingers in a first phase are aligned with the center of an associated pole, the centers of the fingers in a second phase are substantially aligned with a leading edge of an associated pole with an offset, and the centers of the fingers in a third phase are substantially aligned with a trailing edge of an associated pole with an offset, wherein the offset is less than the pole spacing.

12. The motor of claim 1, wherein the number of phases is two, four, or five.

13. The motor of claim 1, wherein each arm further includes a portion formed of molded iron powder composite, solid soft magnetic steel, or electrical lamination material.

14. The motor of claim 1, wherein each finger is configured to act as a salient pole.

15. The motor of claim 1, wherein each arm comprises a plurality of permanent magnets.

16. The motor of claim 1, wherein the number of poles is at least two hundred and fifty.

17. The motor of claim 1, wherein the arms are connected by back iron.

18. The motor of claim 1, wherein the first member and the second member are arranged to rotate relative to one another about an axis.

19. The motor of claim 1, wherein the first member moves linearly relative to the second member.

20. The motor of claim 1, wherein the arms are positioned substantially equidistantly along said second member.

21. The motor of claim 1, wherein each phase has an equal number of arms associated with it.

22. The motor of claim 1, wherein each coil is wound around its associated arm in the same direction relative to said first member.

23. The motor of claim 1, wherein the members comprise molded iron-powder composite, soft magnetic steel, or electrical steel lamination.

24. The motor of claim 1, wherein the motor is configured to be driven by a bipolar motor driver.

25. The motor of claim 1, wherein the number of first member poles is an odd integer.

26. A motor, comprising:
a first member:
a second member:
the members being mounted for movement relative to one another:

the first member having a plurality of poles:
the poles being spaced substantially equidistantly along the first member:
the second member having a plurality of arms:
each arm having a plurality of fingers, a permanent magnet, and a coil:
the fingers having distal ends arranged to generally face toward the poles:
each permanent magnet having a width that is greater than the finger pitch:
wherein each arm is associated with one of a number of phases:
wherein the fingers of the arms within a particular phase are arranged to simultaneously align with respective poles when said members are in one position relative to one another;
wherein the number of phases is at least three: and
wherein the fingers are arranged such that when the centers of the fingers in a first phase are aligned with the center of an associated pole, the centers of the fingers in a second phase are substantially aligned with a leading edge of an associated pole with an offset, and the centers of the fingers in a third phase are substantially aligned with a trailing edge of an associated pole with an offset, wherein the offset is less than the pole spacing.

* * * * *